United States Patent [19]

Sunouchi et al.

[11] Patent Number: 4,500,186

[45] Date of Patent: Feb. 19, 1985

[54] SHUTTER CONTROL DEVICE FOR CAMERA

[75] Inventors: Akio Sunouchi, Tokyo; Ryuji Suzuki, Kanagawa; Masahisa Fujino, Tokyo; Tatsuo Konno, Kanagawa, all of Japan

[73] Assignee: Canon Kabushiki Kaisha, Tokyo, Japan

[21] Appl. No.: 389,885

[22] Filed: Jun. 18, 1982

[30] Foreign Application Priority Data

Jun. 22, 1981 [JP] Japan .................................. 56-96409
Jun. 22, 1981 [JP] Japan .................................. 56-96410

[51] Int. Cl.³ ............................................. G03B 9/34
[52] U.S. Cl. ..................................... 354/234; 354/244
[58] Field of Search ............... 354/234, 235, 241–249, 354/234.1, 235.1

[56] References Cited

U.S. PATENT DOCUMENTS 3,515,049 6/1970 Knapp .................................. 354/243
3,990,089 11/1976 Urano .................................. 354/242
4,024,553 5/1977 Maitani et al. ..................... 354/242
4,215,925 8/1980 Date et al. ........................ 354/244 X Primary Examiner—John Gonzales
Attorney, Agent, or Firm—Toren, McGeady and Stanger

[57] ABSTRACT

A mechanically controlled shutter with a latch for holding the closing curtain in a charged position arranged upon running off of the opening curtain to start operation which then terminates at running off of the closing curtain to control the shutter time, wherein there is provided a keeper for holding the closing curtain latch in the charged position independently of the closing curtain latch, whereby after actuation of a camera release operation and before the opening curtain runs off, the keeper is actuated to release out of holding connection with the closing curtain.

2 Claims, 16 Drawing Figures

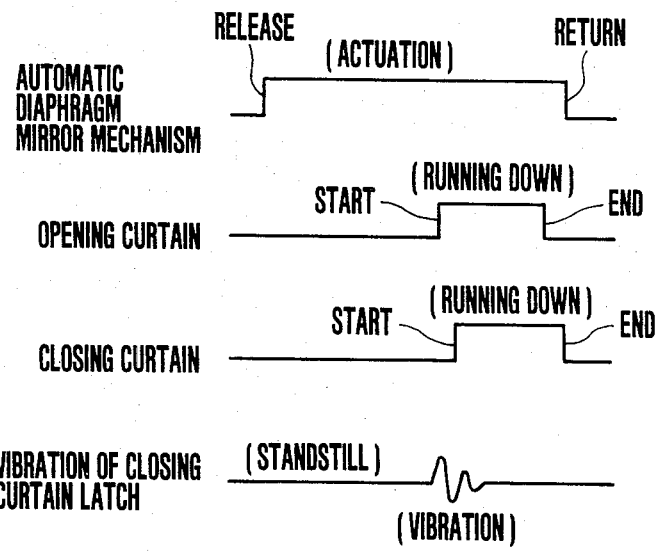

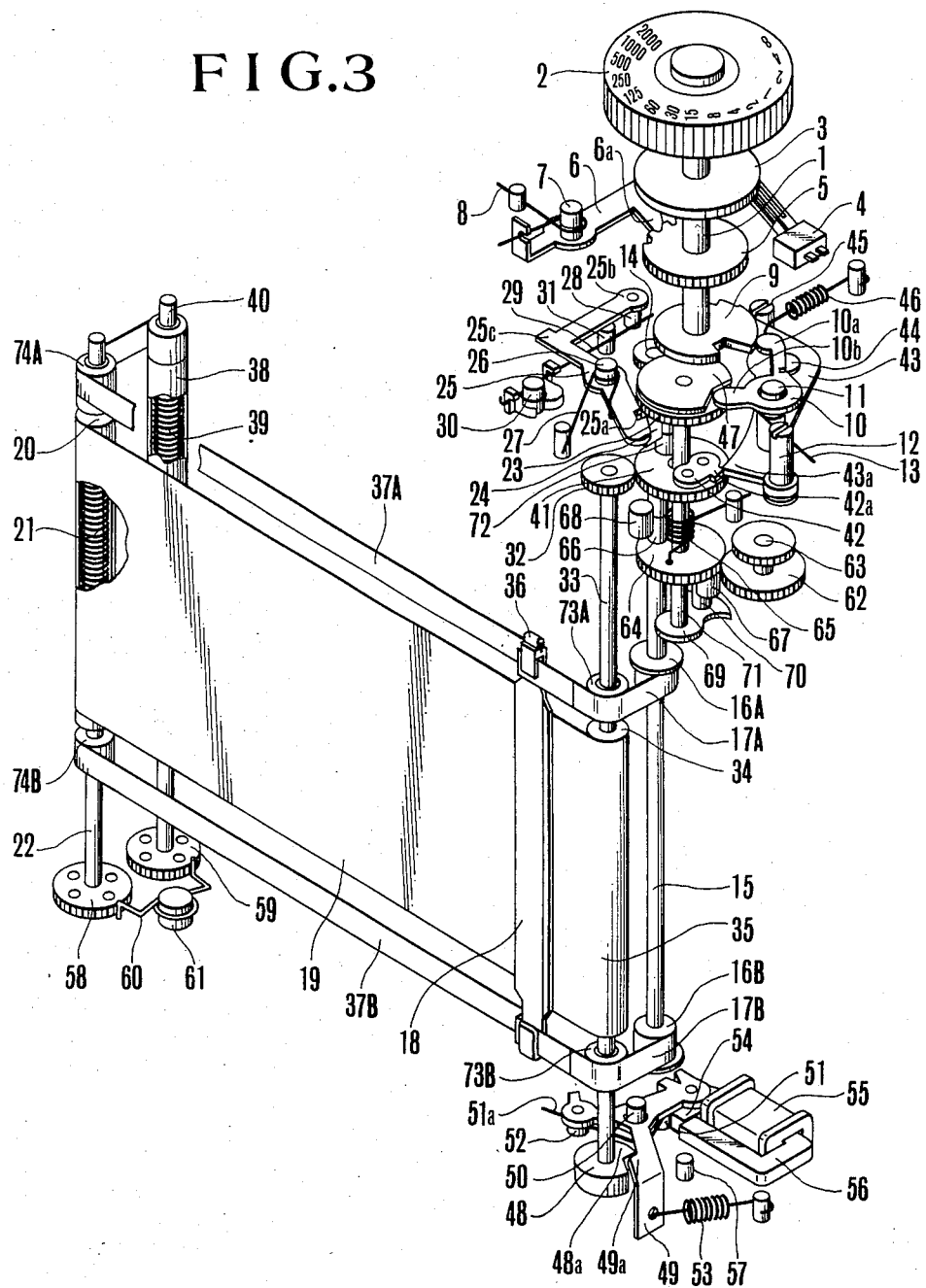

F I G. 4(b)
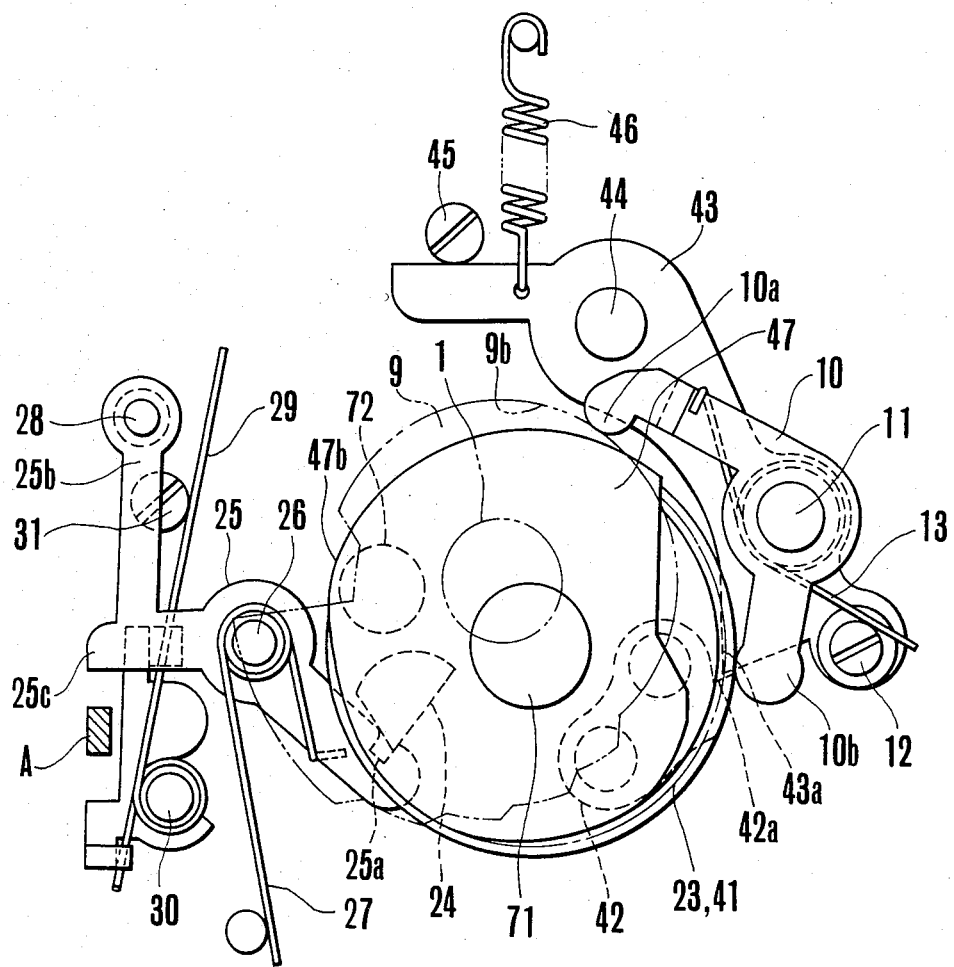

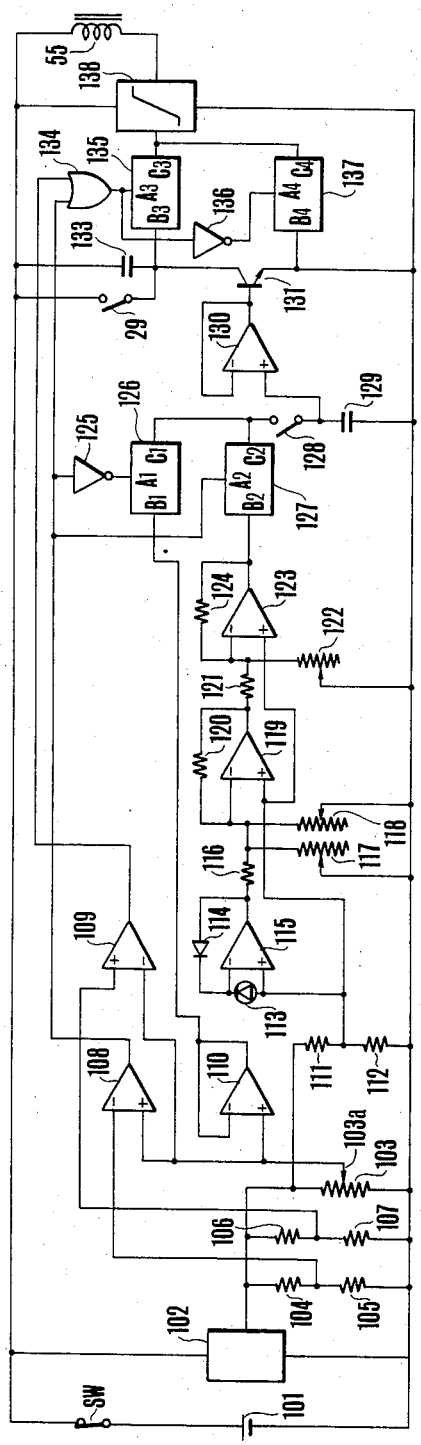
F I G. 7
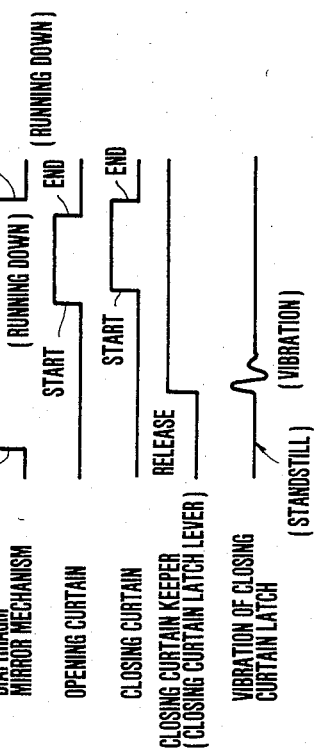
F I G. 8

SHUTTER CONTROL DEVICE FOR CAMERA

BACKGROUND OF THE INVENTION

1. Field of the Invention

This invention relates to a shutter control device for a camera provided with two separate latches to hold the closing member of the shutter in a charged position.

2. Description of the Prior Art

It has been common practice in the prior art, an example of which is depicted in FIGS. 1(a) and 1(b), to latch the shutter of the camera in such a way that, as the camera is being cocked, a charge pin 72' fixed to a gear 41' for a closing or second curtain is turned by a cutout pin 24' fixed to a gear 23' for the opening or first curtain, until it finally reaches the charged position illustrated in FIG. 1(a). A latch lever 25' for the first curtain engages the cutout pin 24' on which the second curtain charge pin 72' abuts, whereby both the first and second curtains are held. It should be noted in connection with this position that there is a prescribed clearance α between a release pawl 43' of a lever for the second curtain and a second curtain run-off plate 42'. Because of the presence of this clearance α, the prior art devices have presented certain problems.

When the shutter is actuated to release from the charged position, the first curtain latch lever 25' is taken out of engagement with the cutout pin 24' to start movement of the first curtain. Though, at the same time, the second curtain is also rendered operative, the run-off catch plate 42' comes into engagement with the latch lever 43' so that the second curtain is held in the position of FIG. 1(b). After that, the second curtain release lever 43' is disengaged from the second curtain run-off catch plate 42' and the second curtain starts to run in accordance with a predetermined shutter time. As the cutout pin 24' moves away from the charge pin 72', the second curtain run-off catch plate 42' is driven by a spring (not shown) to move into abutting engagement on the latch lever 43' which produces a shock. From this moment onwards, the second curtain latch plate 42' or lever 43' vibrates with small amplitudes for a short time (for example, a few milli seconds). In the case of faster shutter speeds, for example, 1/4000 and 1/2000 sec., before this vibration is damped to zero (at a time during the vibrating process) the second curtain run-off catch lever 43' must be actuated. Therefore the formation of the exposure time becomes unstable so that the exposure time varies for different exposures causing uneven effects in the operation of the camera. The timing of the production of the vibration thus produced is illustrated in FIG. 2.

Since, at the same time, the predominance of the uneven operation makes it impossible to narrow the target for adjustment of faster shutter speeds in the assembly of the cameras, preadjusting has been a very difficult operation. Also, since with mass production there occur minute differences in the weight of the shutter mechanism, the strength of the shutter drive spring, and the friction of the finished surfaces of the moving parts, the vibration mentioned above will vary from shutter to shutter, and, in extreme cases, a situation could occur where faster shutter speeds cannot be preadjusted to the design values desired.

Further since the application of treatment to extend the life of the parts causes the frictional coefficient of the moving system to change, the state of the vibration changes with deviation of the faster shutter speeds from required tolerances, and the uneven operational effect is intensified.

As has been mentioned above, the conventional shutter latching mechanism has had various drawbacks with regard to the accuracy of shutter control.

It is, therefore an object of the present invention to eliminate the above-described drawbacks, and to provide for the closing member of the shutter with a release control or first latch and separately therewith a second latch, wherein after actuation of a camera release operation and before the opening member of the shutter runs off, disengagement of the second latch is released to effect engagement of the first latch with the closing member of the shutter, whereby the time of the occurrence of vibration of the shutter closing member run-off mechanism is advanced.

Another object of the present invention is to provide a camera having a mechanically timed shutter with an electromagnetic actuating device for controlling the operation of the closing member of the shutter to provide an electrically timed shutter, whereby the latch member of the electrically timed shutter may serve as the second latch.

SUMMARY OF THE INVENTION

Briefly, the present invention may be described as shutter control device for a camera comprising: a shutter closing member having first and second catch portions; a first catch member cooperative with said first catch portion of said shutter closing member; a second catch member cooperative with said second catch portion of said shutter closing member; a shutter opening member having an engagement portion; an engagement member cooperative with said engagement portion of said shutter opening member; a first member operating in response to actuation of a camera release operation for causing said second catch member to disengage from said second catch portion of said shutter closing member so that said first catch member comes into engagement with said first catch portion of said shutter closing member; a second member operating in response to actuation of a camera release operation, said second member starting to move after the start of movement of said first member, with said engagement member being disengaged from said engagement portion of said shutter opening member to permit action of said shutter opening member; and a mechanical shutter mechanism for releasing said first catch portion of said shutter closing member from the latching connection with said first catch member after a predetermined time from the start of movement of said shutter opening member so that said shutter closing member runs off.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

FIG. 2 is a graph which illustrates a mechanical sequence of the conventional mechanism of FIGS. 1(a) and (b).

FIG. 3 is a perspective view of an embodiment of a shutter with a latch mechanism therefor in a camera according to the present invention.

FIG. 4(b) is a view similar to FIG. 4(a) except that a shorter exposure time than that corresponding to the maximum slit width is set.

FIG. 7 is a diagram of a control circuit of the camera of FIG. 3.

FIG. 8 is a timing chart illustrating a mechanical sequence of the operations of the various parts of the mechanis of FIG. 3.

DESCRIPTION OF THE PREFERRED EMBODIMENT

Figure 1A:
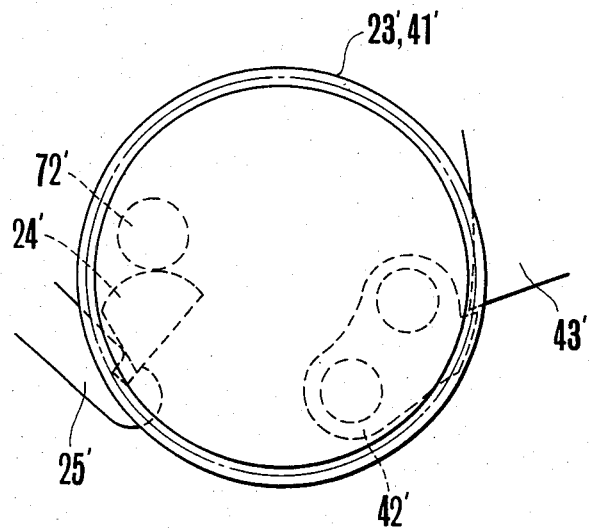
FIGS. 1(a) and 1(b) are schematic diagrams which illustrate a conventional shutter latch mechanism shown in a charged and in an opening member released position, respectively.
Figure 1B:
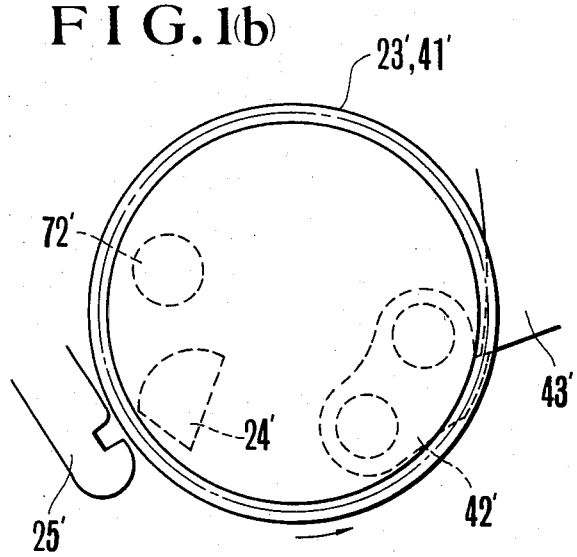

The present invention will next be described in connection with an embodiment thereof by reference to the drawings. In FIG. 3 there is shown a shutter control mechanism where a dial shaft 1 fixedly carries a shutter dial 2, a shutter speed reader disc 3 having an electrically conductive pattern, a click cam 5 and a speed control cam disc 9. The shutter dial 2 has a shutter speed scale cooperating with an index (not shown) when in the shutter priority or manual exposure mode. The disc 3 cooperates with a brush 4 in such a manner that information representing a preselected value of shutter speed set on the shutter dial 2 is emitted in the form of an electrical signal to a control circuit (not shown). The dial click cam 5 has a number of detent slots corresponding to that of settable shutter speed values on the shutter dial 2 and cooperates with a lever 6 pivotally mounted on a pin 7 and urged by a spring 8 in a clockwise direction to bring its pawl 6a into engagement in one of the detent slots so that the dial 2 is hindered from accidentally shifting from the selected position. The cam disc 9 is provided with a stepped graduation to mechanically adjust the shutter time in a range of from the fastest (1/2000 sec.) to a value (1/90) corresponding to the maximum slit width of the shutter. A lever 10 is rotatably mounted on a pivot pin 11 fixed on a rear curtain stopping lever 43. A spring 13 of which one end is held by a pin 12 on the latch lever 43 urges the lever 10 with its one end 10a into abutting engagement on one of the steps of the cam disc 9 and its opposite end 10b extends into the path of rotative movement of one of the portions of different radii of a control cam disc 47. A pinion 14 is fixedly mounted on the top end of a shaft 15 which further carries two fixed drums 16A and 16B on which are wound one end each of ribbons 17A and 17B, the opposite ends of which are connected to the upper and lower sides of a right metal border 18 of an opening or first curtain 19. The left end of first curtain 19 is windable on a drum 20. A spring 21 in the drum 20 urges the pinion 14 of the first curtain to turn in a clockwise direction through the first curtain 19, metal border 18 and ribbons 17A and 17B along with the first curtain winding drums 16A and 16B. When the shutter is charged, the ribbons 17A and 17B are wound on the drums 16A and 16B respectively. The wind-up drum 20 is rotatably fitted on a shaft 22. The spring 21 is connected at one end to the shaft 22 and at its opposite end to the drum 20. The shaft 22 fixedly carries an adjusting disc 58 and freely rotatably carries idlers 74A and 74B for ribbons 37A and 37B. A gear 23 of the first curtain fixedly mounted on a shutter shaft 71 fixedly carries an eccentric pin 24 and the control cam disc 47, and meshes with the pinion 14 of the first curtain. The clockwise rotative tendency of the pinion 14 by the spring 21 in the drum 20 urges the gear 23 in a counterclockwise direction. When the shutter is charged, the gear 23 is hindered from counterclockwise movement by a latch lever 25 with its groove 25a catching the eccentric pin 24. The latch lever 25 is pivotally mounted about a pin 26 and urged by a spring 27 to turn in a counterclockwise direction. When the shutter is charged, the spring 27 drives the latch lever 25 to latch up the eccentric or cutout pin 24 on the gear 23 so that the first curtain 19 is maintained in the light blocking position. After actuation of a camera release, a mirror mechanism of known form (not shown) moves, and a member A (see FIGS. 4(a), 4(b)) turns the lever 25 in a clockwise direction against the spring 27, whereby the pawl 25a is disengaged from the cutout pin 24 to start movement of the opening curtain 19. At the same time, an electrically insulated pin 28 on the tail 25b of the latch lever 25 pushes a count switch spring 29 at the free end thereof and takes the latter out of contact with a grounding pin 31. The count switch 29 is held on an insulator member 30 and arranged so that for a setting of 1/2000 to 1/125 sec. it does not count the shutter time, but upon a setting of 1/60 to 8 sec. it does count the shutter time as it is moved away from the grounding pin 31. An electrical signal from the count switch 29 is applied to a control circuit (not shown) by which the operation of an electromagnetic actuator 55 for a closing or second curtain 35 is controlled. A pinion 32 of the second curtain 35 is fixedly mounted on the top end of a shaft 33 together with a winding-off drum 34 on which the second curtain 35 is wound when the shutter is charged. The upper and lower sides of a left metal border 36 of the second curtain 35 are connected to respective ends of ribbons 37A and 37B, the opposite ends of which are windable on a drum 38. A spring 39 in drum 38 urges both the pinion 32 and drum 38 to turn in a clockwise direction. The shaft 33 further fixedly carries a latch disc 48 for a second curtain 35 and rotatably carries the guide roller 73A and 73B for the ribbons 17A and 17B of the first curtain 19. The drum 38 is rotatably fitted on a shaft 40 and is driven by the spring 39 to wind up the ribbons 37A and 37B when the second curtain runs down. The spring 39 is connected at one end of the shaft 40 and at the opposite end to the drum 38. A shaft 40 fixedly carries an adjusting disk 59. A gear 41 meshing with the pinion 32 of the second curtain is rotatably fitted on the shutter shaft 71 and fixedly carries a latch disc 42 and a second curtain charge pin 72. The clockwise rotative tendency of the pinion 32 imparted by the spring 39 in the drum 38 urges the gear 41 in a counterclockwise direction. When the shutter is charged, the gear 41 is hindered from counterclockwise movement by a latch lever 49 with its pawl 49a engaging in a cutout 48a of the latch disc 48, along with the pinion 32 and shaft 33. A run-off catch lever 43 is pivotally mounted about a pin 44 and fixedly carries the pivot pin 11 of exposure time control lever 10 and a pin 12. When the shutter is charged, a pawl 43a protrudes into the path of movement of a lug 42a of a catch disc 42 fixedly mounted on the gear 41 of the second curtain and is positioned securely with a prescribed clearance of the lug 42a. The run-off catch lever 43 also serves to move the exposure time control lever 10 to an operative position for the preset value of exposure time. A stopper 45 limits clockwise movement of the lever 43 by a spring 46. The cam disc 47 is fixedly mounted on the gear 23 of the first curtain and has curved portions of different distances from the center of rotation (which correspond with mechanically adjusted shutter times ranging from the minimum to the maximum slit width). As the opening curtain runs down, the cam disc 47 is turned along with the gear 23 in a counterclockwise direction. At a time during the turning process, one of the curved portions strikes the exposure control lever 10 at the tail 10b, whereby the closing curtain run-off catch lever 43 is turned about the pin 44 in a counterclockwise direction, until the pawl 43a is disengaged from the lug 42a of the catch plate 42 fixed to the gear 41 of the closing curtain to start movement of the closing curtain 35. The second latch lever 49 is pivotally mounted about a pin 50 and fixedly carries a pin 52 and an armature 54. A pawl 49a engages the cutout portion 48a of latch disc 48 and hinders clockwise movement of the pinion 32 and shaft 33 by the spring 39 in the drum 38 so that the closing curtain 35 is held in the charged position. A charge spring 51 is stronger than a return spring 53. When a winding operation is performed, a member B (see FIG. 4(c)) pushes one end 51a of the spring 51 to give the latch lever 49 a clockwise bias force so that the armature 54 on the latch lever 49 comes into intimate contact with a yoke 56 of a solenoid 55. The return spring 53 drives the latch lever 49 to turn in a counterclockwise direction until it abuts on a stopper pin 57, whereby the pawl 49a of latch lever 49 is disengaged from the cutout 48a of latch disc 48 to start movement of the closing curtain 35 when in the electrically timed shutter mode. The solenoid 55 cooperates with the shutter time reader or brush 4 in such a manner that when the preset value of shutter time is in a range of 1/2000 to 1/125, it remains unenergized, and when in a range of 1/60 to 8, it is energized for a corresponding period depending upon a count signal from the switch or spring 29. The yoke 56 responsive to energization of the solenoid 55 attracts the armature 54 on the latch lever 49, and its attractive force is preadjusted so as to overcome the force of return spring 53. The first adjusting disc 58 can change the driving force of the spring 21 in the first curtain winding-up drum 20 so as to permit adjustment of the speed of running down movement of the opening curtain 19. The second adjusting disc 59 can change the driving force of the spring 39 in the second curtain winding-up drum 38 so as to permit adjustment of the speed of running down movement of the closing curtain 35. A set leaf spring 60 is supported on a peg 61 and holds the first and second adjusting discs 58 and 59 in the adjusted positions where the tensions of the springs 21 and 39 are maintained constant. A shutter charge gear 62 rotates about a shaft 63 in a counterclockwise direction when a winding lever is cocked, and meshes with a gear 64 to transmit its motion thereto. Some of the teeth of the gear 62 are cut off. The gear 64 is rotatably fitted on the shutter shaft 71, fixedly carries a charge pin 67 and a charge gear stopper 66 and lacks one tooth to avoid abnormal meshing engagement with the gear 62. When charging the shutter, the gear 64 is driven by the charge gear 62 to turn in a clockwise direction against a spring 65, with its motion being transmitted from a charge pin 67 through a pin 70 fixed to a charge lever 69. When the charged position is reached, as the portion of the charge gear 62 lacking teeth results in the disengagement of the charge gear 64 from the gear 62, the spring 65 acts on the gear 64 to turn until the stopper 66 on the gear 64 abuts on the pin 68, whereby the shutter charge mechanism is returned to the initial position. The lever 69 is fixedly mounted on the bottom end of the shutter shaft 71 and fixedly carries the pin 70. When charging the shutter, clockwise movement of the charge gear 64 is received by the pin 70 so that the latter is turned clockwise, and its rotative movement is transmitted through the shutter shaft 71 to the first curtain gear 23. As the gear 23 is driven to turn in the clockwise direction, the first curtain is charged. The shutter shaft 71 fixedly carries the charge lever 69 and gear 23 and movably carries the second curtain gear 41 and charge gear 64. A second curtain charge pin 72 is fixedly mounted on the gear 41 of the second curtain, and when charging the shutter, receives clockwise movement of the first curtain gear 23, from the cutout pin 24, while turning the second curtain gear 41 in the clockwise direction, thus charging the second curtain 35.

The operation of the shutter of such construction is next described with reference to FIGS. 4 to 6. Let us take a first example of the shutter time at 1/500 sec. as is representative of the speeds faster than (1/90) corresponding to the maximum slit width, namely, 1/2000 to 1/125 sec. set in the shutter dial 2. When the shutter is charged, the control mechanism assumes a position illustrated in FIG. 4(a). That is, the latch lever 25 for the first curtain is engaged at its catch groove 25a with the cutout pin 24 fixed to the gear 23 of the first curtain, whereby the first curtain 19 is held in a light blocking position. As will be described more fully later, the second curtain 35 is held in a light unblocking position by the latch lever 49 engaging the latch disc 48, while the second curtain run-off catch lever pawl 43a lying in the path of movement of the lug 42a of the plate 42 fixed to the gear 41 of the second curtain is spaced from the lug 42a with the certainty of a prescribed distance. Also the cutout pin 42 is set apart from the second curtain charge pin 72 by a prescribed distance. Furthermore, though the count start switch 29 is arranged to operate in any mode, it is in this case that even when the resilient movable contact 29 is moved away from the grounding pin 31, the control circuit is made unresponsive thereto. The shutter time control lever 10 takes a position such that its one end 10a is situated in the one of the steps of the cam disc 9 which is determinative for 1/500 sec., namely, the step 9a, and the opposite end 10b lies in the path of movement of the corresponding curve portion 47a of the control cam disc 47. Also the member A to be moved just before the mirror is cleared of the light path waits in a position spaced from the extension 25c of the first curtain latch lever 25.

Figure 4A:
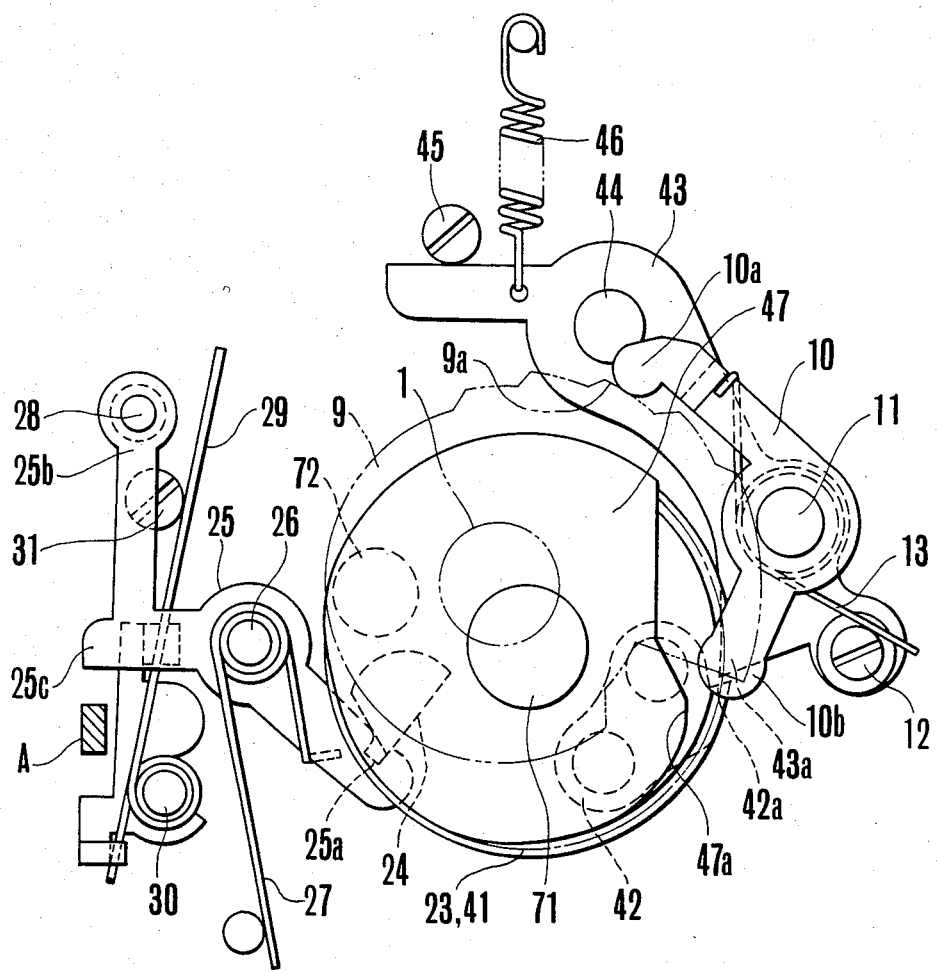
FIG. 4(a) is a top plan view of a shutter control mechanism in a charged position with setting of an exposure time longer than that corresponding to the maximum slit width of the shutter.
Figure 4C:
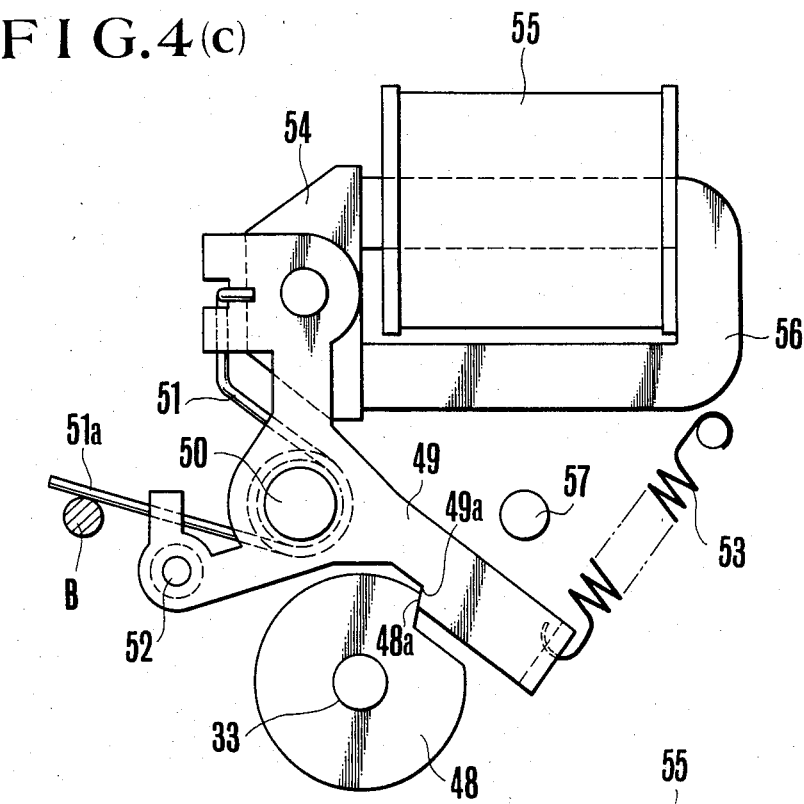
FIG. 4(c) is a top plan view of the electromagnetic actuating device of FIG. 3.

On the other hand, as illustrated in FIG. 4(c), the member B which acts after actuation of a camera release and before the start of movement of the first curtain 19 lies in a position to press one end 51a of the stronger charge spring 51 than the return spring 53 and therefore to exert a bias force by which the second curtain latch lever 49 is urged to turn in the clockwise direction to insure that the armature 54 fixed to the second curtain latch lever 49 is in intimate contact with the magnet yoke 56, and the pawl 49a engages in the cutout 48a of the second curtain latch disc 48 to hold the second curtain 35 (see FIG. 3) in the charged position. Also the solenoid 55 is disconnected from the control circuit therefor.

In order to explain the manner in which the shutter control mechanism operates with the setting of 1/500 sec. reference will be made to FIGS. 5(a)-(d).

Figure 5A:
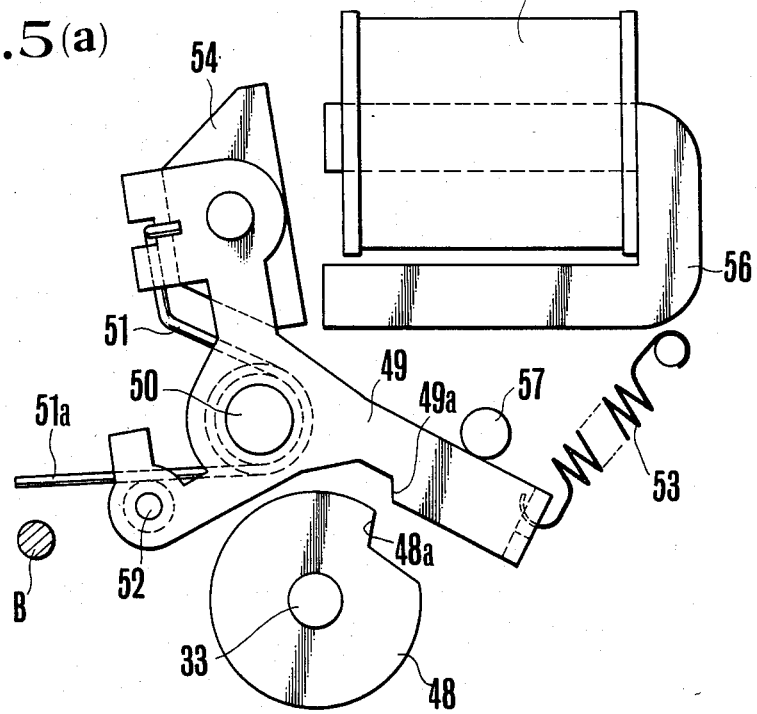
FIGS. 5(a) to 5(d) are top plan views of the main parts of the shutter control mechanism when set on a longer exposure time than that corresponding to the maximum slit width with FIG. 5(a) illustrating the released position of the electromagnetic actuating device, FIG. 5(b) a position just before the opening member runs off, FIG. 5(c) a position just after the opening member runs off, and FIG. 5(d) a position when the closing member runs off.

At first, when the shutter button (not shown) is pushed down, the member B is retracted through an intermediary (not shown) from the position of FIG. 4(c) to the position of FIG. 5(a) where the one end 51a of the charge spring 51 abuts on the pin 52 fixed to the latch lever 49 so that the force which has so far impelled the latch lever 49 in the clockwise direction is no longer applied. And, since the solenoid 55 remains unenergized, the latch lever 49 is then turned in the counterclockwise direction by the return spring 53 until its side edge abuts on the stopper 57, whereby the pawl 49a is withdrawn from the cutout 48a of the latch disc 48.

Figure 5B:
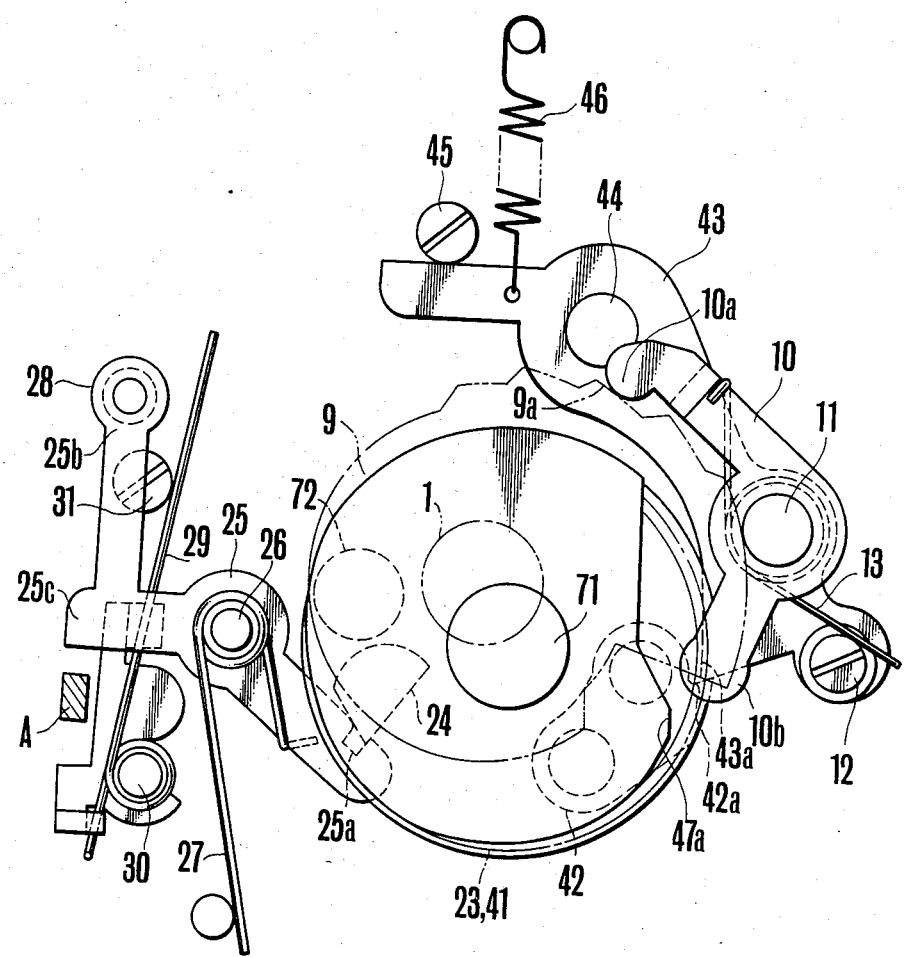

This brings the second curtain run-off catch lever pawl 43a into engagement with the lug 42a of the catch plate 42 under the action of the counterclockwise rotative tendency of the gear 41 of the second curtain as illustrated in FIG. 5(b). From this time onwards, the run-off catch lever 43 is used to retain the second curtain 35 (see FIG. 3) so that the second curtain 35 does not start to run off. It is also to be noted that though the charge pin 72 for the second curtain is allowed to follow up along with the counterclockwise movement of the gear 41, its travel is not so long as to cause interference with the cutout pin 24.

Then, the mirror moves upwards. Just before the mirror reaches the terminal end of upward movement, the member A is moved from the position of FIG. 5(b) to a position of FIG. 5(c) where it strikes the first curtain latch lever 25 at the extension 25c and turns the latter in the clockwise direction against the spring 27. When the catch groove 25a liberates the cutout pin 24, as the gear 23 turns in the counterclockwise direction, the first curtain 19 (see FIG. 3) starts to run off.

Figure 5C:
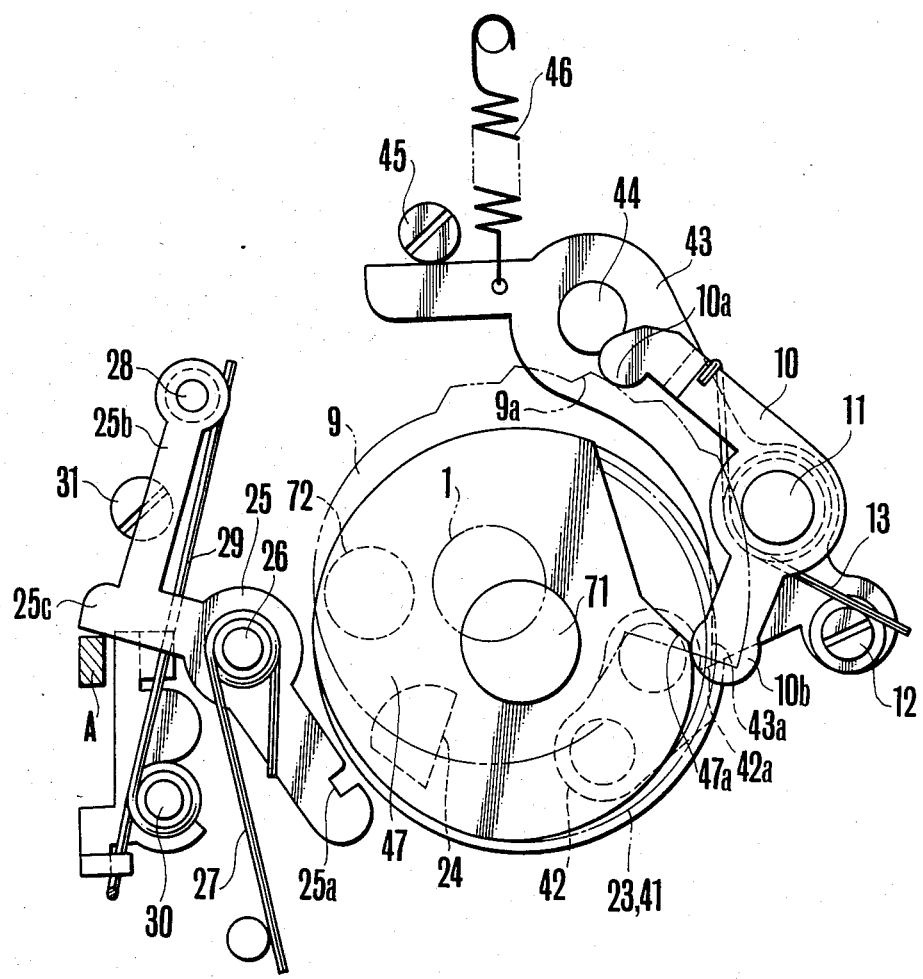
Figure 5D:
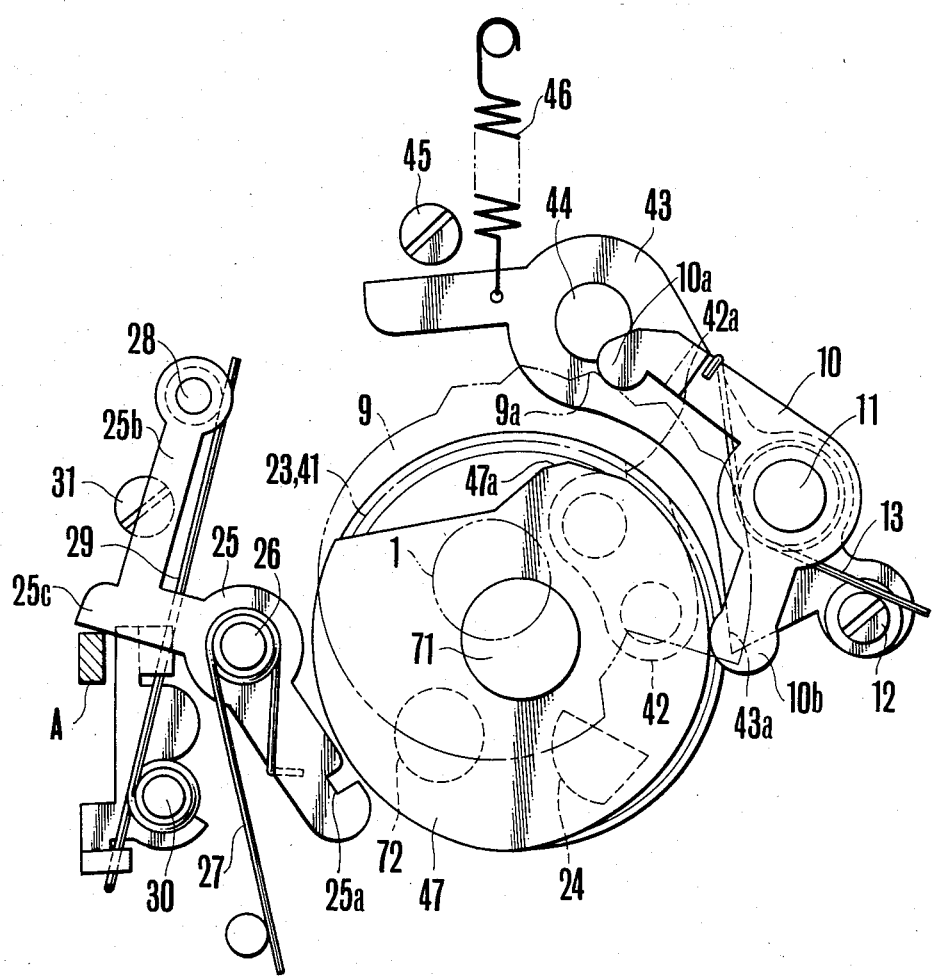

On the other hand, clockwise movement of the first curtain latch lever 25 also causes the count start switch 29 to be taken out of contact with the grounding pin 31 by the pin 28 on the lever end 25b as illustrated in FIG. 5(c). But, since the selection of the mechanically timed exposure mode rendered the control circuit unresponsive to movement of the switch 29 away from the grounding pin 31, this actuation of the switch 29 has no effect on the other parts. Then, as the gear 23 of the first curtain turns, the control cam disc 47 on the gear 23 also turns in the counterclockwise direction. At a time during the turning process of the disc 47, the curve 47/a for 1/500 sec. strikes the exposure time control lever 10 at the tail 10b and then turns the latter about a point of abutting engagement of the head 10a on the step 9a for 1/500 sec. Since the pivot pin 11 of the lever 10 is borne by the second curtain run-off catch lever 43, such movement of the control lever 10 causes the catch lever 43 to turn about the pin 44 in the counterclockwise direction against the spring 46 which in turn causes the pawl 43a to release the lug 42a of the second curtain catch plate 42 from the latching connection as illustrated in FIG. 5(d). Then, the gear 41 of the second curtain rotates in the counterclockwise direction to start the running off movement of the second curtain 35 (see FIG. 3).

The foregoing represents a manner in which the shutter operates when any one of the exposure times of 1/2000 to 1/125 sec. or a shorter exposure time than the maximum slit width (1/90 sec.) is preselected.

Secondly, in the case of the exposure times of 1/60 to 8 sec. or times longer than the maximum slit width or 1/90 sec., the shutter operates in the electrically timed exposure mode in the manner described hereinafter.

Taking as an example ½ sec., the shutter control mechanism is first assumed to be in a charged position illustrated in FIG. 4(b), where the first curtain latch lever 25 holds the first curtain 19 (see FIG. 3) in the light blocking position as in the case of 1/500 sec. as the cutout pin 24 is latched by the groove 25a, and the second curtain 35 is held in the open position by the latch lever 49 engaging the latch disc 48. The pawl 43a of the second curtain run-off catch lever 43 lies in the path of movement of the lug 42a as spaced from the lug 42 with a certain prescribed distance. Also the cutout pin 24 lies ahead the second curtain charge pin 72 by the prescribed clearance. The count start switch spring 29 is in contact with the grounding pin 31 as in the case of 1/500 sec. But, what is different is that when the count start switch 29 is moved away from the grounding pin 31, a control circuit to be described later is actuated to count the shutter time, controlling the period of energization of the solenoid 55 as illustrated in FIG. 4(c). The slit width control lever 10 assumes a position where the head 10a is situated in the step 9b for 1/90 sec. and the tail 10b extends into the path of movement of the curve 47b of the cam disc 47 for 1/90 sec.

Also, the member A to be moved just before the mirror reaches the terminal end of upward movement is standing by ready in a position spaced from the extension 25c of the first curtain latch lever 25 as in the case of 1/500 sec.

On the other hand, the member B which is activated after fluctuation of a camera release and before the first curtain 19 (see FIG. 3) starts to run off lies in a position to press one arm 51a of the stronger charge spring 51 than the return spring 53 so that the second curtain latch lever 49 is urged to turn in the clockwise direction with the armature 54 thereon being in a tight contact with the yoke 56 as illustrated in FIG. 4(c). Since, at the same time, the solenoid 55 is energized by current from the control circuit to be described later, the armature 54 is attracted to the yoke 56 by the magnetic force. Also the pawl 49a engages in the cutout 48a of the latch disc 48 to hold the second curtain 35 (see FIG. 3) is in the charged position.

Now referring to FIG. 6, the operation with the setting of ½ sec. is described below.

Figure 6A:
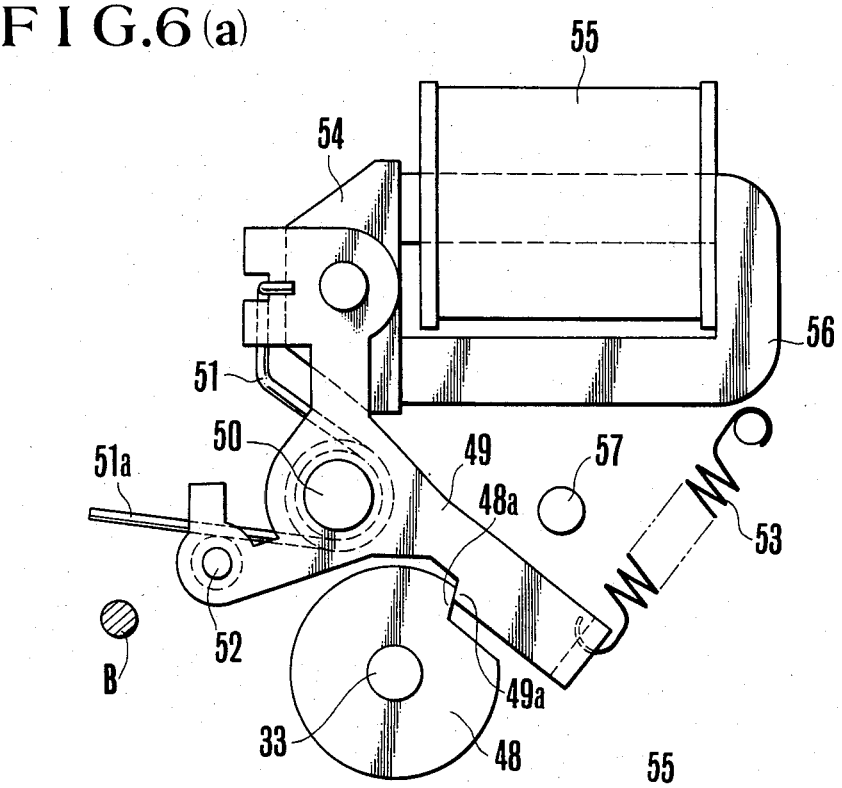
FIGS. 6(a) to 6(c) are top plan views of the main parts of the shutter control mechanism of FIG. 3 when set on a slower exposure time than that corresponding to the maximum slit width with FIG. 6(a) illustrating a charged position of the electromagnetic actuating device, FIG. 6(b) an arrangement of the opening and closing curtain gears, and FIG. 6(c) a released position of the electromagnetic device.

Upon actuation of a camera release, a release member (not shown) moves the member B from the position of FIG. 4(c) to a position of FIG. 6(a), where the charge spring 51 no longer acts on the second curtain latch lever 49. But, the control circuit has already energized the solenoid 55, whereby the latch lever 49 is hindered from turning in the counterclockwise direction under the action of the return spring 53 as the armature 54 is attached to the magnet yoke 56. Therefore, the latch lever pawl 49a is not withdrawn from the cutout 48a of the latch disc 48 and the second curtain does not as yet start to run off.

Figure 6C:
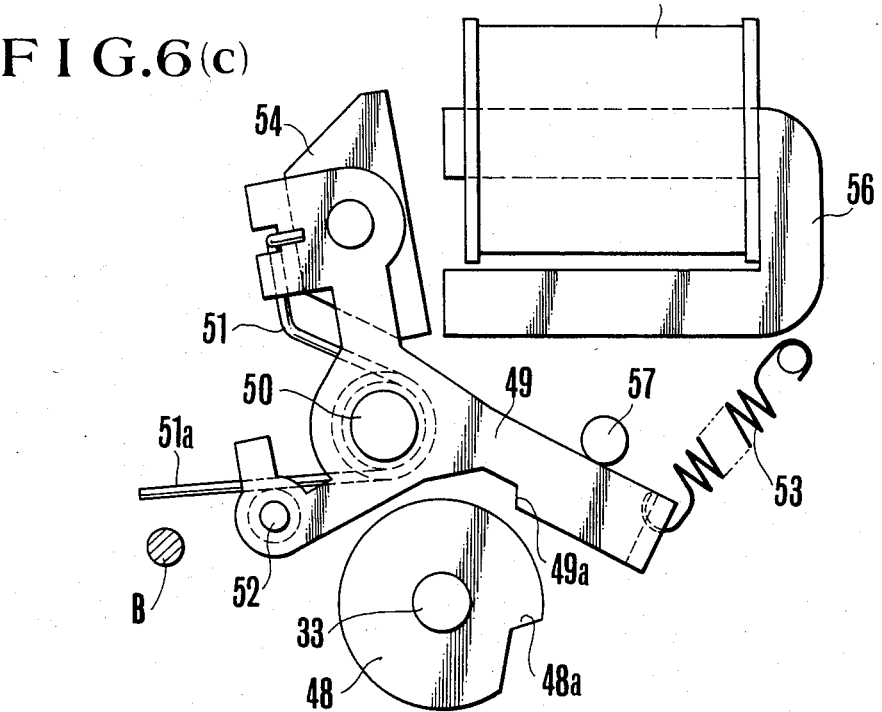
Figure 6B:
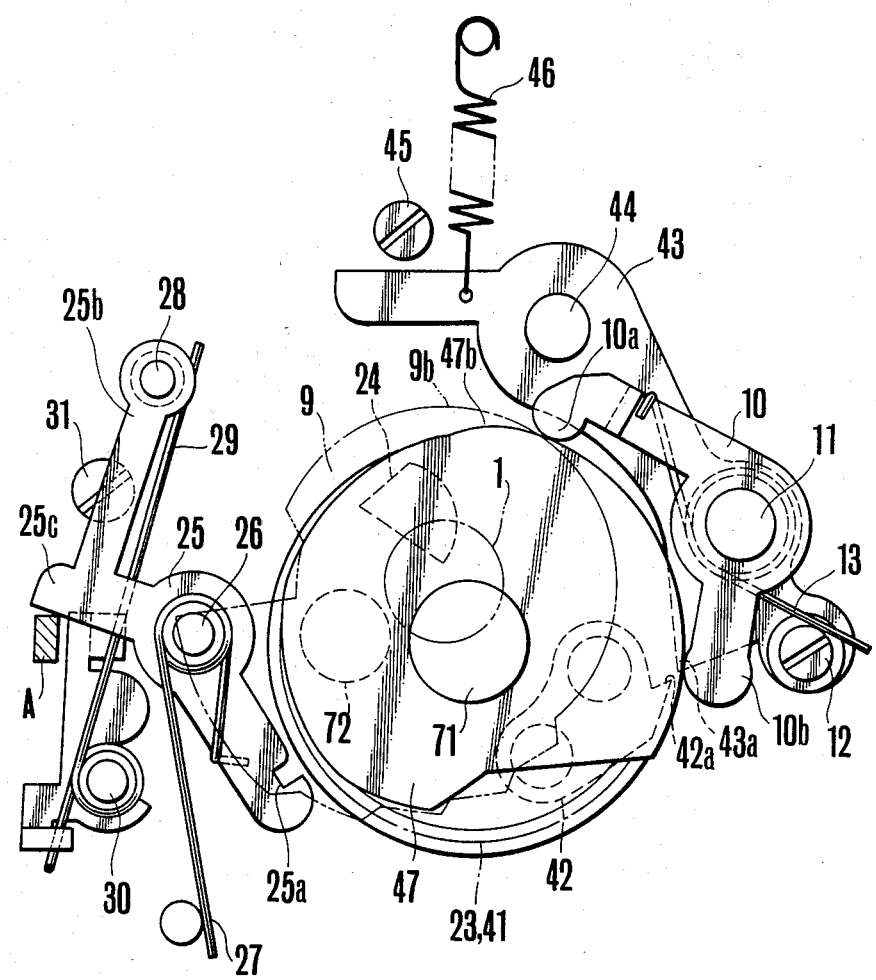

Then, just before the mirror reaches the terminal end of upward movement, the member A moves from the position of FIG. 4(b) to a position of FIG. 6(b) where it strikes the latch lever 25 at its extension 25c and turns the latter in the clockwise direction against the spring 27, whereby the cutout pin 24 on the gear of the first curtain is released from latching connection with the latch lever pawl 25a. As the gear 23 is allowed to turn in the counterclockwise direction, the first curtain 19 (see FIG. 3) starts to run off. On the other hand, such clockwise movement of the latch lever 25 also causes the pin 28 on one end 25b thereof to take the count start switch spring 29 out of contact with the grounding pin 31, which in turn causes the control circuit to count the exposure time. Thus, a net energization of the solenoid 55 begins at this time.

As the aforesaid rotative movement of the gear 23 of the first curtain goes on, it is in an interval of 1/90 sec. that the curve 47b of the control cam disc 47 strikes the shutter slit width control lever 10 at its tail 10b and then turns the lever 10 about the head 10a thereof on the step 9b of the cam disc 9, whereby the second curtain run-off catch lever 43 is turned about the pin 44 in the counterclockwise direction against the spring to retract the pawl 43a from the path of movement of the lug 42a as illustrated in FIG. 6(b).

In a time interval ½ sec. from the movement of the count start switch spring 29 away from the grounding pin 31, the solenoid 55 is de-energized to permit the counterclockwise movement of the second curtain latch lever 49 under the action of the return spring 53, whereby the pawl 49a is drawn from the cutout 48a of the latch disc 48. Then, the second curtain 35 (see FIG. 3) runs down, terminating the exposure.

The foregoing represents a manner in which the shutter operates with the setting of any one of the exposure times of 1/60 to 8 sec. or a longer exposure time than 1/90 sec. corresponding with the maximum slit width of the shutter.

A resetting operation of the shutter from the released position to the charged position of FIG. 3 is now described by reference to FIG. 3.

When cocking a rapid winding lever (not shown), a film transportation mechanism (not shown) operates in a manner known in the art and as it moves the shutter charge gear 62 turns about the shaft 63 in the counterclockwise direction. It is noted that in the shutter released position, the portion of the gear 62 devoid of teeth confronts the gear 64 so that the latter is freely rotatable. But, soon after the gear 62 starts to rotate, the gear 62 comes into engagement with the gear 64, and the gear 64 is turned about the shutter shaft 71 in the clockwise direction against the spring 65. Since the pin 70 on the charge level 69 lies on the advancing side of the charge pin 67, and the second curtain charge pin 72 on the advancing side of the cutout pin 24 of the first curtain gear 23 (in FIG. 3, however, this is not valid because the shutter is made ready to be released), clockwise movement of the charge gear 64 is transmitted through the connection of the pins 67 and 70, the shutter shaft 71 and the connection of the cutout pin 24 and second curtain charge pin 72 to turn the first and second curtain gears 23 and 41 in the clockwise direction, while moving the first and second curtains 19 and 35 backward. When the curtains 19 and 35 near the terminal end of movement, the cutout pin 24 passes over the catch groove 24 of the first curtain latch lever 25. Then, while pushing the second curtain charge pin 72, the cutout pin 24 further moves to turn the gear 41 of the second curtain in the clockwise direction. Therefore, the pinion 32, shaft 33 and latch disc 48 are further turned in the counterclockwise direction until the cutout 48a of the latch disc 48 comes into engagement with the pawl 49a of the second curtain latch lever 49. Thus, the second curtain 35 is latched up in the charged position, and the pawl 43a of the second curtain run-off catch lever 43 is positioned in the path of movement of the lug 42a of the second curtain run-off catch plate 42 at the prescribed distance therefrom. Then, as the gear 62 takes an angular position such that the nontoothed portion confronts the gear 64 again, the gear 64 is allowed to turn in the counterclockwise direction until the charge gear stopper 66 abuts on the pin 68, thereby made ready for the next shutter charging operation. Such liberation of the charge gear 64 from the gear 62 causes the cutout pin 24 on the gear 23 to turn backwards or counterclockwise by the over-charged distance as it is passed over the catch groove 25a of the first curtain latch lever 25 and then to engage with the latter. Thus, the first curtain is latched up in the charged position, and the other parts reach their positions of FIG. 3.

The manner in which the shutter control system of the invention operates differs with different exposure modes and different ranges of exposure times as summarized in the following table:

| Exposure Time | Exposure Mode | |
|---|---|---|
| | Manual & Shutter Priority | Aperture Priority |
| 1/2000 | Mechanical Control | Mechanical Control |
| 1/1000 | " | Electrical Control |
| 1/500 | " | " |
| 1/250 | " | " |
| 1/125 | " | " |
| 1/90 | " | " |
| 1/60 | Electrical Control | " |
| 1/30 | " | " |
| 1/15 | " | " |
| 1/8 | " | " |
| 1/4 | " | " |
| 1/2 | " | " |
| 1 | " | " |
| 2 | " | " |
| 4 | " | " |
| 8 | " | " |

In the case of the manual and shutter priority exposure modes, the operation of the shutter for the faster exposure time formation is controlled mechanically, and for the slower exposure time formation is controlled electrically. Even if the electrical control will not work because of power loss in the battery, the possibility of making an exposure with the presetting of a slower exposure time than 1/90 is assured, although the actual exposure time is revised to 1/90 sec. automatically.

Similarly, in the case of the aperture priority mode, the operation of the shutter is controlled electrically for formation of all the exposure times except 1/2000 sec. for which it is controlled mechanically. Even if the electrical control will not work, the possibility of making an exposure with automatic switching to 1/2000 sec. is assured.

FIG. 7 illustrates the circuitry of the camera of the invention. 101 is a battery; SW is a power switch; 102 is a constant voltage circuit; 103 is a variable resistor for setting in a desired exposure time across which a constant voltage of the circuit 102 is applied and which cooperates with the shutter dial in such a manner that when the shutter dial is set in auto position, the voltage at the output terminal 103 takes a maximum value that is to say the voltage of output voltage of the constant voltage circuit 102, and when the shutter dial is turned to a manual position, as the shutter time is progressively longer, the voltage at the tap 103a of the variable resistor 103 becomes progressively lower; 104 and 105 are resistors of a voltage divider of which the output voltage lies between the maximum possible voltage of the variable resistor 103 and the highest resulting from the setting of the shutter dial to the manual position (for example, at 1/2000 sec.); 106 and 107 are resistors of a voltage divider across which is applied the output voltage of the constant voltage circuit 102 and of which the output voltage lies between the voltages at the output terminal 103a of the variable resistor 103 corresponding to, for example, 1/60 and 1/125 sec.; 108 is a voltage comparator for comparing the output voltage of the voltage divider (104, 105) with the output voltage of the variable resistor 103 to produce a signal of low level when the latter is lower, and a signal of high level when the latter is higher; 109 is a voltage comparator for comparing the output voltage of the voltage comparator (106, 107) with the output voltage of the variable resistor 103 to produce a signal of high level when the latter is lower, and a signal of low level when the latter is higher; 110 is an operational amplifier functioning as a buffer amplifier having an input connected to the output of the variable resistor 103; 111 and 112 are resistors of a voltage divider across which is applied the output voltage of the constant voltage circuit 102 and of which the output voltage is used as a bias of each of operational amplifiers 115, 119 and 123; 113 is a photo-sensitive element for producing a current of intensity proportional to the level of brightness of an object to be photographed; 114 is a logarithmic compression diode; 115 is an operational amplifier cooperating with the diode 114 for converting the current of the photo-sensitive element to a voltage in the logarithmically compressed form; 116 is a resistor; 117 is a film speed setting resistor; 118 is a variable resistor for correcting the curvature at the full open aperture of the lens; 119 is an operational amplifier for computing the object brightness, film speed and curvature correction; 120 and 121 are resistors; 122 is a variable resistor for setting an aperture value; 123 is an operational amplifier for computing the output of the operational amplifier 119 and the preset aperture value to produce an output voltage representing a shutter time; 124 is a resistor; 125 is an inverter for inverting the output of the comparator 108; 126, 127, 135 and 137 are switching circuits operating in such a manner that when A1, A2, A3 or A4 become high level, B1 and C1, B2 and C2, B3 and C3, or B4 and C4 are rendered conductive to each other, and when it becomes low level, they are rendered non-conducting to each other. Applied to A1 of switching circuit 126 is the output of the inverter 125, and to the A2 of switching circuit 127 is the output of the comparator 108; 128 is a memory switch which is turned off when a mirror (not shown) flips upwards; 129 is a memory condenser to which either one of the output of the operational amplifiers 110 and 123 is applied when the switching circuit 126 or 127 is conducting; 130 is an operational amplifier functioning as a buffer amplifier; 131 is a transistor for logarithmic expansion; 29 is the count start switch (see FIGS. 4 to 6), this switch turning off when the opening curtain of the shutter runs off, and turning on when the shutter is cocked; 133 is a condenser to be charged with current from the transistor 131; 134 is an OR gate having inputs connected to the outputs of the comparators 108 and 109 and having an output connected to the A3 of the switching circuit 135; 136 is an inverter for inverting the output of the OR gate 134, the output of this inverter 136 being applied to the A4 of the switching circuit 137; 138 is a Schmitt triggern circuit; 55 is the solenoid of FIGS. 3 to 6 of which the current supply is controlled by the Schmitt trigger circuit 138. The Schmitt trigger circuit responsive to input voltage of prescribed level or higher energizes the solenoid 55. The input terminal of this Schmitt trigger circuit 138 is connected to the C3 and C4 of the switching circuits 135 and 137. The B3 of the switching circuit 135 is connected between the condenser 133 and the transistor 131. The B4 of the switching circuit 135 is connected to the negative terminal of the battery 101.

In the operation of the circuit of FIG. 7, when an exposure is to be made in the aperture priority mode, the operation will first turn the shutter dial to "A" position where the slider 103a on the shutter speed setting variable resistor 103 is moved to produce the maximum voltage and the mechanical timing control provides 1/2000 sec. By this, it is made possible to perform the electrical shutter timing control over the entire range of from the maximum to the minimum shutter times. Then, when a shutter button (not shown) is pushed down, the power switch SW is turned on, and the maximum voltage appears at the slider 103a of the shutter speed setting variable resistor 103. Therefore, the voltage comparator 108 produces a signal of high level, and the voltage comparator 109 produces a signal of low level. Responsive to these signals, the switching circuits 127 and 135 are turned on so that the B2 and C2, and B3 and C3 are rendered conducting to each other in each pair. Therefore, a high voltage is applied to the input of the Schmitt trigger circuit 138 and the output of the Scmitt trigger 138 becomes low level so that the solenoid 55 is energized. On the other hand, a current proportional to the object brightness flows through the photo-sensitive element 113 to the operational amplifier 115 and diode 114 which produce a voltage proportional to the logarithm of the current intensity.

This voltage representing the object brightness level is computed with the voltages representing the sensitivity of the used film and the correction factor from the variable resistors 117 and 118 by the operational amplifier 119 of which the output is then applied to the operational amplifier 123. This amplifier 123 computes the output of the operational amplifier 119 and the output of the aperture setting variable resistor 122. The exposure value obtained by this computation, in this instance, exposure time in the form of a voltage is produced from the operational amplifier 123 and is applied through the aforesaid switching circuit 127 to the memory condenser 129. The voltage stored in this memory condenser 129 is converted through the operational amplifier 130 to a logarithmically expanded circuit by the translator 131. Then, after the mirror has been flipped upward in response to actuation of a camera release, the opening curtain runs down. Such upward ovement of the mirror also causes the memory switch 128 to open so that the voltage on the memory condenser 129 is stored. And, at the start of movement of the opening curtain, the count start switch 29 is opened to charge the condenser 133 with the logarithmically expanded current by the transistor 131. In 1/2000 sec. from the start of movement of the opening curtain, the control cam disc 47 which rotates in unison with the gear 23 of the opening curtain acts on the tail 10b of the slit width control lever 10, whereby the closing curtain run-off catch lever pawl 43a is moved away from the path of movement of the lug 42a. Since, at this time, however, the pawl 49a of the closing curtain latch lever 49 is still engaging the cutout 48a of the latch disc 48, the closing curtain 35 is hindered from running off. Then, as charging of the condenser 133 goes on, when the potential at a point on connection between the condenser 133 and the transistor 131 reaches a predetermined level, the voltage on the input of the Schmitt trigger circuit 138 falls below the prescribed level, and the output of the Schmitt trigger circuit 138 is inverted to cut off the current supply to the solenoid 55. Therefore, the latch lever 49 is turned in the counterclockwise direction by the return spring 35, whereby the pawl 49a is withdrawn from the cutout 48a. Thus, the closing curtain 35 runs down, terminating the exposure.

In the mechanically timed shutter mode operating with selection of shutter times ranging from 1/2000 sec. to 1/125 sec., taking as an example 1/500 sec. and with reference to FIGS. 6 and 7, when the shutter button (not shown) is first pushed down, the power switch SW is turned on and a voltage corresponding to a shutter time of 1/500 sec. appears at the slider 103a of the variable resistor 103. Responsive to this voltage, the comparators 108 and 109 both produce signals of low level which are applied to turn on the respective switching circuits 126 and 127. As the B4 and C4 are rendered conducting to each other, the input terminal of the Schmitt trigger circuit 138 is connected to the negative terminal of the battery 101 so that the output of the Schmitt trigger circuit 138 is maintained at lower level. Therefore, the solenoid 55 is hindered from energization, permitting the second curtain latch lever 49 to turn in the counterclockwise direction under the action of the return spring 53 when the member B is moved away therefrom. Thus, the second curtain run-off catch lug 42a is brought into effective engagement with the catch lever pawl 43a.

Then, the upward movement of the mirror is followed by the start of running down movement of the first curtain 19. As the gear 23 of the first curtain turns as a unit with the control cam disc 47, it is in the 1/500 sec. from the start of movement of the first curtain that the slit width control lever 10 is moved by the disc 47 to release the lug 42a of the second curtain run-off catch plate 42 from latching connection with the pawl 43a. Thus, the second curtain of the shutter runs down, terminating the exposure.

In the manual or shutter priority mode with the electrical shutter timing control in the range of 1/60 to the slowest or 8 sec., taking as an example of ½ sec. and with reference to FIGS. 5 and 7, when the shutter button (not shown) is first pushed down, the power switch SW is turned on and a voltage corresponding with a shutter time of ½ sec. appears at the slider 103a of the variable resistor 103. Therefore, the voltage comparator 108 produces an output signal of low level, and the comparator 109 produces an output signal of high level. Responsive to these signals, the switching circuits 126 and 135 turn on with their paths between B1 and C1 and between B3 and C3 in the conducting state. Therefore, the high voltage arrives at the input of the Schmitt trigger circuit 138, changing the output of the Schmitt trigger circuit 138 to low level, whereby the solenoid 55 is supplied with current. As the switching circuit 126 is closed, the output of the operational amplifier 110 in the form of a voltage related to the resistance value of the variable resistor 103 is applied to the memory condenser 129 through the switching circuit 126. Then, this voltage stored on the memory condenser 129 is converted by the operational amplifier 130 and transistor 131 to a logarithmically expanded current. Then, just before the first curtain 19 runs off, the upward movement of the mirror results in opening of the memory switch 128, whereby the voltage to which the memory condenser 129 has been changed is stored thereon. Then, when the first curtain 19 starts to run down, the count start switch 29 is caused to open. Then, the condenser 133 is charged with the logarithmically expanded current by the transistor 131. In 1/90 sec. from the start of movement of the first curtain, the control cam disc 47 on the gear 23 of the first curtain acts on the tail of the slit width control lever 10 which in turn causes the second curtain catch lever 43 to turn in the counterclockwise direction against the spring 46 until its pawl 43a is drawn to clear the lug 42a of the second curtain run-off catch plate 42. Since, at this time, however, the second curtain latch lever pawl 49a is not yet released from the cutout 48a of the latch disc 48, the second curtain 35 is hindered from running off. Then, as charging of the condenser 133 goes on, when the potential at a point on the connection between the condenser 133 and the transistor 131 reaches the predetermined level, the voltage at the input of the Schmitt trigger circuit 138 falls below the prescribed level, and the output of the Schmitt trigger circuit 138 is changed to a high level at which the duration of energization of the solenoid 55 is terminated. Therefore, the return spring 53 turns the latch lever 49 in the counterclockwise direction until the pawl 49a liberates the latch disc 48. Thus, it is in ½ sec. after the first curtain 19 runs off that the second curtain 35 starts to run off, terminating the exposure.

Though the aforegoing embodiment has been described in connection with a camera having a mechanically and electrically timed shutter with an electrically operated actuator arresting the latch member (49) to hold the closing curtain in the as-charged position, the principles of the invention are applicable to other types of cameras having a mechanically timed shutter such that a mechanical actuating means for the aforesaid latch lever 49 is arranged to hold the second curtain in the as-charged position and upon actuation of a camera release to clear the second curtain of the latch lever before the latch lever for the first curtain is actuated, so that the shock of the re-latching of the second curtain produces no vibrating effect on the timing control of the shutter.

As has been described above, the present invention concerns cameras equipped with a conventional mechanically timed shutter, and contemplates the use of the member cooperative with the mechanical actuator for releasing a running off of the closing curtain to control adjustment of the shutter time, namely, the second curtain run-off catch lever, in combination with an additional member for holding the second curtain in the cocked position, namely, the second curtain latch lever, whereby the latter member is actuated to release running-off of the second curtain after actuation of a camera release and before the first curtain latch member of lever is actuated so that the vibration of the second curtain which would otherwise occur when the first curtain starts to run off as in the prior art mechanical control of the shutter is allowed to drop to zero before the start of movement of the first curtain. With the second curtain having been stabilized against rebounds, therefore, adjustments of the shutter time relative to the start of running off movement of the first curtain can be controlled with increased accuracy for the faster times (for example, 1/2000 and 1/1000 sec.). Another advantage is that the shutter control mechanisms can be manufactured economically while maintaining improved precision accuracy, and the maintenance of accuracy with aging is also improved. This leads to the possibility of achieving an extra-fast shutter time of 1,4000 sec. which was heretofore impossible to realize.

While a specific embodiment of the invention has been shown and described in detail to illustrate the application of the inventive principles, it will be understood that the invention may be embodied otherwise without departing from such principles.

What we claim:

1. A shutter control device for a camera, comprising:
   (a) a shutter closing member having first and second catch portions;
   (b) a first catch member cooperative with said first catch portion of said shutter closing member;
   (c) a second catch member cooperative with said second catch portion of said shutter closing member, said second catch member producing a gap between said first catch member and said first catch portion while it is in engagement with said second catch portion of said shutter closing member;
   (d) a shutter opening member having an engagement portion;
   (e) an engagement member cooperative with said engagement portion of said shutter opening member;
   (f) charge means operative in correspondence to windup operation of the camera to engage said second catch member with said second catch portion of said shutter closing member by overcharge operation and to produce said gap between said first catch member and said first catch portion of said shutter closing member and then to engage said engagement member with said engagement portion of said shutter opening member;
   (g) a first member operating in response to actuation of a camera release operation for causing said second catch member to disengage from said second catch portion of said shutter closing member, said disengagement causing said shutter closing member to actuate across said gap to bring said first catch member into engagement with said first catch portion of said shutter closing member;
   (h) a second member operating in response to actuation of a camera release operation, said second member starting to move after the start of movement of said first member, with said engagement member being disengaged from said engagement portion of said shutter opening member to permit action of said shutter opening member; and
   (i) a mechanical shutter mechanism for releasing said first catch portion of said shutter closing member from the latching connection with said first catch member after a predetermined time from the start of movement of said shutter opening member so that said shutter closing member runs off.

2. A device according to claim 1, further comprising:
   (i) electrical shutter control means for electrically controlling the timing of running-off of said shutter closing member, and including
      an electromagnet, said control means being operative to control release of said second catch portion of said shutter closing member from the latching connection with said second catch member irrespective of actuation of said first member.

* * * * *